United States Patent [19]

Teunissen

[11] Patent Number: 5,181,343
[45] Date of Patent: Jan. 26, 1993

[54] APPARATUS AND PROCESS FOR GRINDING A PROFILE OF A BAND SAW

[76] Inventor: Jeremias Teunissen, Weteringpad 1, 3762 En Soest, Netherlands

[21] Appl. No.: 799,709

[22] Filed: Nov. 26, 1991

Related U.S. Application Data

[63] Continuation of Ser. No. 490,589, filed as PCT/PL89/00047, on Jun. 9, 1989, abandoned.

[30] Foreign Application Priority Data

Jun. 10, 1988 [NL] Netherlands ............ 8801491

[51] Int. Cl.$^5$ ............................................. B24B 21/00
[52] U.S. Cl. .................................. 51/135 R; 51/142; 51/147; 76/25.1; 76/112
[58] Field of Search .............. 51/135 R, 141, 142, 51/147, 132; 76/112, 25.1

[56] References Cited

U.S. PATENT DOCUMENTS

| | | | |
|---|---|---|---|
| 4,026,073 | 5/1977 | Betzler | 51/100 R |
| 4,082,014 | 4/1978 | Idel | 51/5 D |

FOREIGN PATENT DOCUMENTS

| | | |
|---|---|---|
| 45747 | 1/1888 | Fed. Rep. of Germany . |
| 3622490 | 5/1987 | Fed. Rep. of Germany . |
| 70702 | 7/1959 | France . |
| 81/02403 | 9/1981 | PCT Int'l Appl. . |

OTHER PUBLICATIONS

Abrasive Methods Engineering vol. 2, pp. 556–557 Industrial Press, 1980.

Primary Examiner—M. Rachuba
Attorney, Agent, or Firm—Majestic, Parsons, Siebert & Hsue

[57] ABSTRACT

Apparatus for the grinding of a profile of a band saw, which apparatus is provided with an abrasive medium disposed above a track along which the band saw is conducted under operating conditions and whereby a relative motion between the band saw and the abrasive medium can be effected in the plane of the bank saw for the grinding of individual consecutive parts of the profile of the band saw, in which the abrasive medium substantially consist of an endless grinding belt which can circulate continuously in the plane of the band saw over at least one pressure pulley and which can effect its whetting action while moving in the longitudinal direction over a specific part of the band-saw profile during at least one part of the said motion in the plane of the band saw.

6 Claims, 3 Drawing Sheets

APPARATUS AND PROCESS FOR GRINDING A PROFILE OF A BAND SAW This is a continuation of application Ser. No. 07/490,589 filed as PCT/PL89/00047, on Jun. 9, 1989, now abandoned.

The invention relates to an apparatus for the grinding of a profile of a band saw, which apparatus is provided with an abrasive medium disposed above a track along which the band saw is conducted under operating conditions and whereby a relative motion between the band saw and the abrasive medium can be effected in the plane of the band saw for the grinding of individual consecutive parts of the profile of the band saw.

The invention also relates to a process of the aforesaid type.

An apparatus of the said type is generally known. In the known apparatus, a band saw is conducted along a circular whetstone which acts as the abrasive medium. In this operation the whetstone, which has been disposed at right angles to the longitudinal direction of the band saw, rotates on its axis. By causing the whetstone to perform a series of substantially upward and downward motions in the plane of the band saw and by simultaneously moving the band saw continuously along its track, individual consecutive parts of the band-saw profile are ground.

A disadvantage of the known apparatus is that the grinding operation proceeds transversely to the longitudinal direction of the band saw, which gives rise to hair cracks in the teeth of the band-saw profile during sawing. A further drawback associated with grinding of a band-saw profile by means of the known apparatus is that the teeth of the profile are not ground uniformly in this fashion. This is due to the following cause. With each downward motion of the whetstone, the continuous displacement of the band saw along its track permits the grinding of one individual part of the band-saw profile. On account of the characteristic shape of a band-saw profile, the whetstone, will wear off non-uniformly during operation. As a result, the teeth of a band-saw profile will be ground unevenly. The refacing of the whetstone itself, whether manually or mechanically, for instance with the aid of a stone, in order to obtain a "uniformly worn" whetstone, does not lead to satisfactory results in actual practice, because either the desired precision of the refacing is not attained or the adjustment of the suspension in particular and the upward and downward motion of the whetstone have to be repeated after each refacing, which in actual practice will again lead to non-uniform grinding of the teeth of the band-saw profile. Yet another drawback of the known apparatus is that a whetstone has no constant performance in terms of "grinding coarseness", that is to say, a whetstone is inherently incapable of grinding the teeth of a band-saw profile with a constant degree of coarseness or fineness at all times.

An object of the present invention is to provide an apparatus and a process for the grinding of a profile of a band saw whereby the teeth of the band-saw profile are ground uniformly and with a constant degree of coarseness without causing the occurrence of (hair) cracks in these teeth during sawing.

To achieve this object, an apparatus of the type mentioned hereinbefore is characterized in that the abrasive medium substantially consists of an endless grinding belt which can circulate continuously in the plane of the band saw over at least one pressure pulley and which can effect its whetting action while moving in the longitudinal direction over a specific part of the band-saw profile during at least one part of the said motion in the plane of the band saw. Because each individual part of the band-saw profile is ground in the longitudinal direction, no (hair) cracks occur in its teeth. Also, the use of a grinding belt which circulates continuously over a pressure pulley ensures that the teeth of a band-saw profile are ground not only uniformly but also more smoothly and sharply than heretofore. As the outer surface of the grinding belt has a coating of sand grains, for instance alumina, which may have been applied by an electrostatic procedure, grinding by means of the apparatus according to the invention guarantees a constant "grinding coarseness".

One embodiment of an apparatus according to the invention is characterized in that under operating conditions the grinding belt, after each whetting action involving motion in the longitudinal direction over a specific part of the band-saw profile, during which motion the band saw undergoes hardly any displacement along its track, can move in such a fashion in the plane of the band saw, during which motion the band saw is displaced along its track, that the grinding belt can perform a consecutive whetting action in the longitudinal direction over a subsequent part of the band-saw profile and so forth until the whole or a desired section of the band-saw profile has been ground. When the band saw itself is not displaced during grinding, a more accurate whetting action is achieved without entailing any risk of crack formation during sawing with a band saw so treated.

A further embodiment of an apparatus according to the invention is characterized in that the motion of the grinding belt in the plane of the band saw is induced by the provision of a connected push/pull rod which can be conducted by positive drive according to a pattern corresponding with this motion.

Yet another embodiment of an apparatus according to the invention is characterized in that it comprises a bearing frame for supporting a band saw, on which frame the band saw can be conducted along its track, whilst at least part of the bearing frame is hingeable relative to a horizontal shaft. This design makes it possible for one man to fix a band saw in position, as will be elucidated hereinafter.

The invention will now be explained further with reference to the accompanying drawings, in which.

Figure 1:
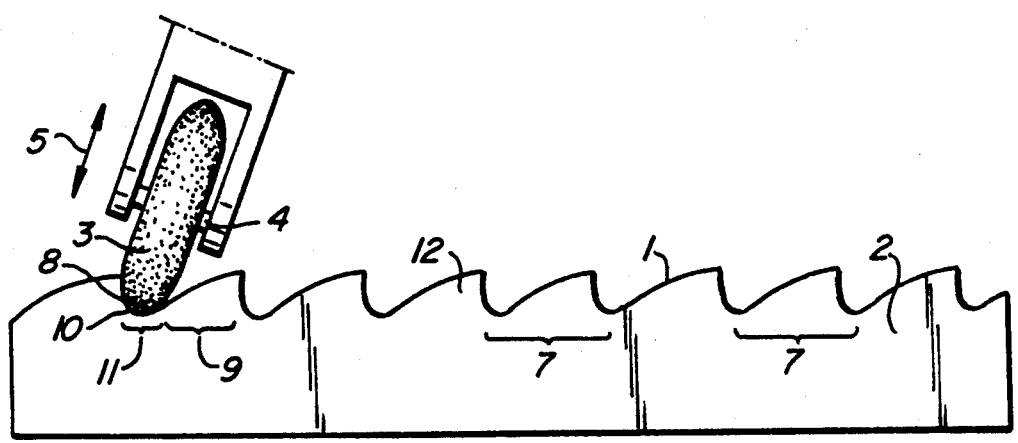
FIG. 1 is a simplified diagram showing how a band-saw profile is ground according to the state of the art.

FIG. 1 schematically represents the grinding of a band-saw profile 1 according to the state of the art. The apparatus includes a whetstone 3 disposed at right angles to the longitudinal direction of a band saw 2, the said whetstone 3 rotating on its axis 4 under operating conditions. By causing the whetstone 3 to perform a series of upward and downward motions in the plane of the band saw 2 according to arrow 5 and by simultaneously moving the band saw 2 continuously along its track in the direction of arrow 6, individual consecutive parts 7 of the profile 1 of band saw 2 are ground. As mentioned hereinbefore, hair cracks occur in the profile 1, because this mode of operation involves grinding transversely to the longitudinal direction of the band saw 2. As a part 8 of the whetstone 3 takes care of grinding a part 9 of a profile tooth 12, which part 9 is larger than part 11 of a profile tooth 12, the grinding of which is effected by a part 10 of the whetstone 3 under operating conditions, part 8 wears away faster than part 10. As a result, the whetstone 3 is worn non-uniformly, which ultimately leads to unevenly ground profile teeth 12.

Figure 2:
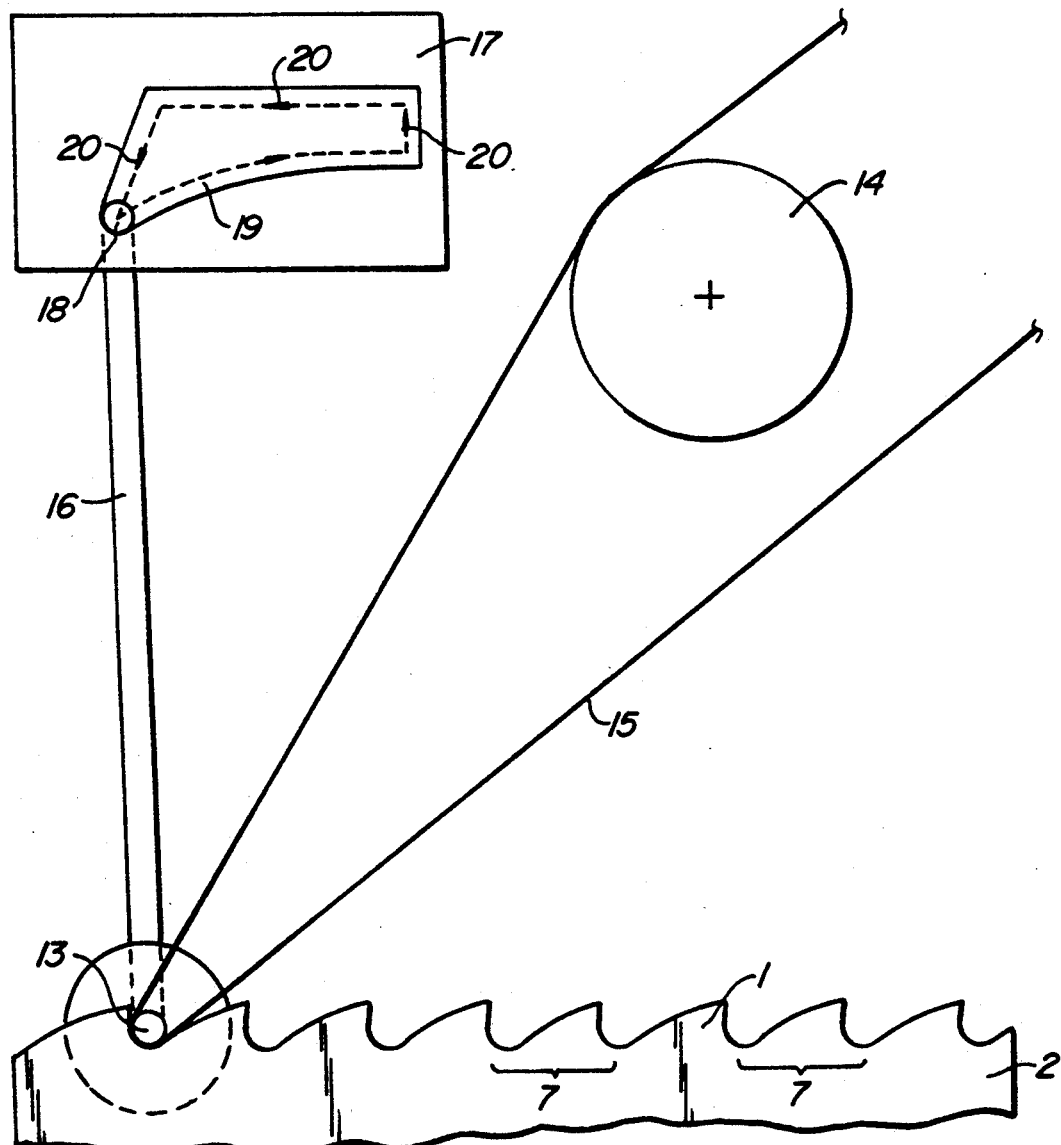
FIG. 2 is a simplified diagram showing how a band-saw profile is ground according to the invention.

FIG. 2 schematically depicts the mode of grinding according to the invention for a profile 1 of a band saw 2. A grinding belt 15 which, under operating conditions, runs continuously over a pressure pulley 13 and a tensioning pulley 14 effects its whetting action while moving in the longitudinal direction over a part 7 of the band-saw profile 1 during at least a part of its motion in the plane of the band saw 2. This motion of the grinding belt 15 in the plane of the band saw 2 is induced by a push/pull rod 16 which is conducted by positive drive along a pattern 17 conforming to this motion. The end 18 of the push/pull rod 16 therefore passes every time along a trajectory 19 in the direction of the arrows 20. It is to be observed that the band saw 2 is only displaced along its track whenever the grinding belt 15 makes no whetting contact with the band-saw profile 1 during its displacement in the plane of the band saw 2, so that individual consecutive parts 7 of the band-saw profile 1 are ground. As the apparatus according to the invention operates without requiring any refacing or readjustment, it is fully automatic in the sense that no personnel need constantly be in attendance for readjustment, refacing and the like. Thus, according to the invention an operator-friendly apparatus is obtained which in actual practice also proves to be low-noise.

Figure 3:
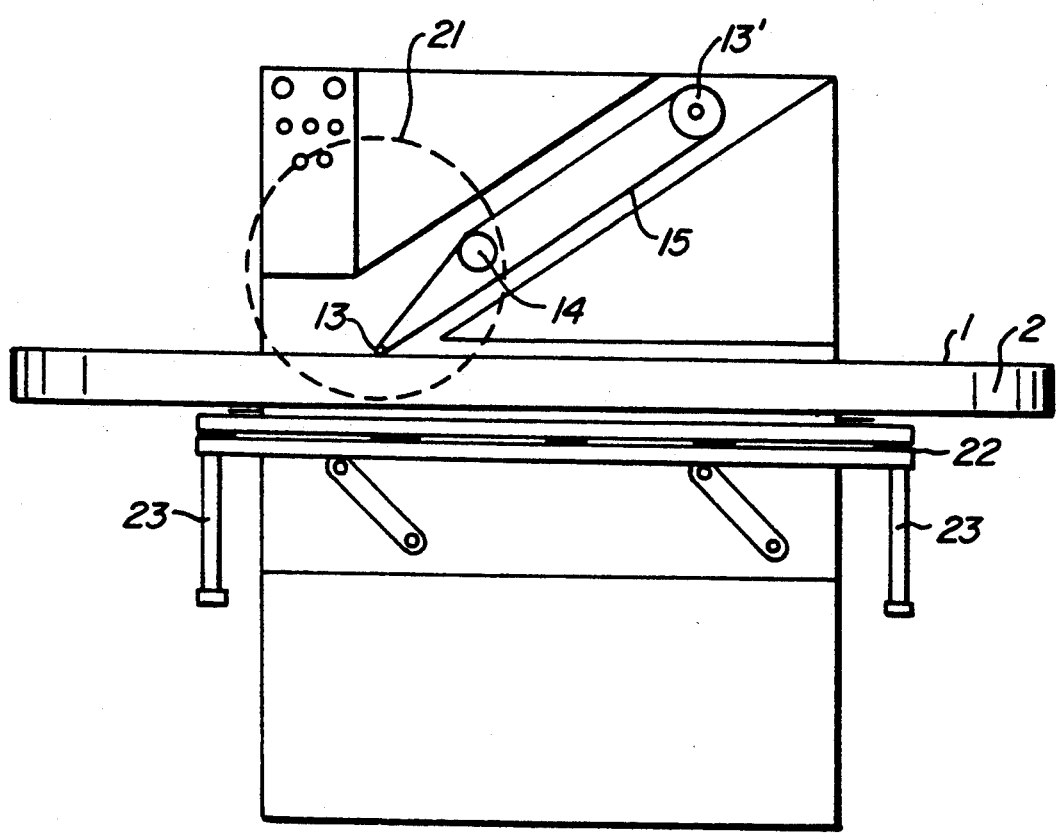
FIG. 3 is a side view of an apparatus according to the invention.

FIG. 3 represents a view of an apparatus according to the invention in which the part enclosed within a dashed circle 21 corresponds with that shown in FIG. 2. Here the grinding belt 15 moves continuously over a driving pulley 13', the pressure pulley 13 and a tensioning pulley 14. A bearing frame 22 on which the band saw 2 can be conducted along its track is here present in duplicate. The bearing frame 22 is conducted to members 23 intended to displace the band saw 2 in a vertical plane for adjustment of the grinding height.

Figure 4:
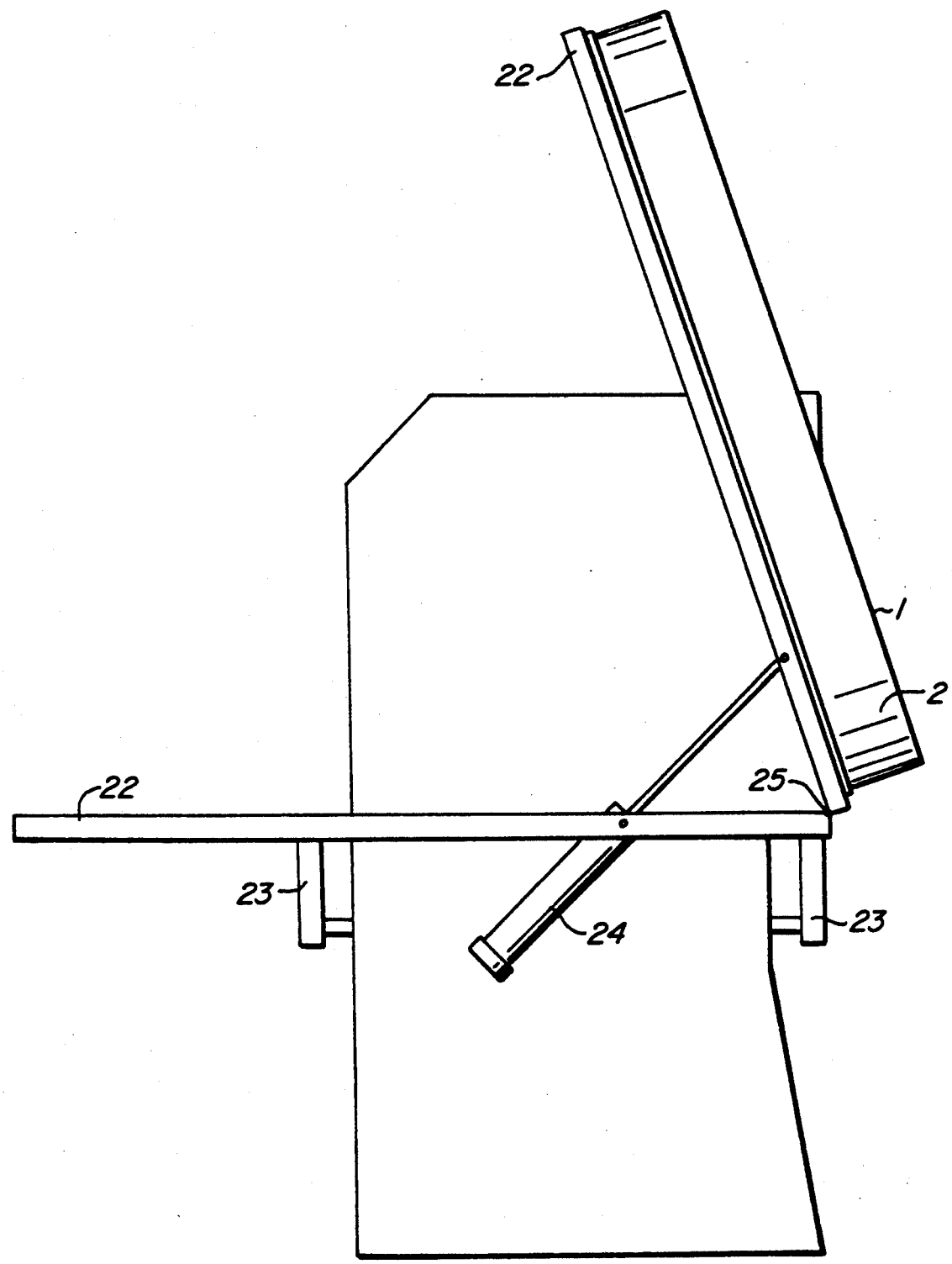
FIG. 4 is a side view of an apparatus according to the invention showing that at least part of a bearing frame incorporated into the structure of this apparatus is hingeable.

FIG. 4 is a lateral view of an apparatus according to the invention shown in FIG. 3. Here the upper part of the duplicate bearing frame 22 is pivotable on a horizontal shaft 25 with the aid of a pneumatic cylinder 24. In the situation as drawn, the band saw 2 can be positioned on the upper part of the bearing frame 22 by one man, because it need not be lifted over the entire device as with earlier designs. A final point worth observing is that a metal, for instance stellite, has been applied to a tooth of a band-saw profile for reinforcement.

I claim:

1. An apparatus for the grinding of a profile of a band saw, which apparatus is provided with an abrasive medium disposed above a track along which the band saw is conducted under operating conditions and whereby a relative motion between the band saw and the abrasive medium can be effected in the plane of the band saw for the grinding of individual consecutive parts of the profile of the band saw, characterized in that the abrasive medium substantially consists of an endless grinding belt which can circulate continuously in the plane of the band saw over at least one pressure pulley and means whereby said band saw effects its whetting action while moving in the longitudinal direction over a specific part of the band-saw profile during at least one part of the said motion in the plane of the band saw.

2. An apparatus according to claim 1, characterized in that means are provided so that under operating conditions the grinding belt, after each whetting action involving a longitudinal motion over a specific part of the band-saw profile, during which motion the band saw undergoes substantially no displacement along its track, can move such that it makes no whetting contact with said band saw, during which latter motion the band saw is displaced along its track, so that the grinding belt can perform a consecutive whetting action in the longitudinal direction over a subsequent part of the band-saw profile until desired sections of the band-saw profile have been ground.

3. An apparatus according to claim 1 or 2, characterized in that the motion of the grinding belt in the plane of the band saw is induced by the provision of a connected push/pull rod which can be conducted by positive drive according to a pattern corresponding with this motion.

4. An apparatus according to claim 1 or 2, characterized in that it comprises a tensioning pulley over which the grinding belt can be made to move.

5. An apparatus according to claim 1 or 2, characterized in that it comprises a bearing frame for supporting a band saw, on which frame the band saw can be conducted along its track, whilst at least part of the bearing frame is hingeable relative to a horizontal shaft.

6. A process for grinding a profile of a band saw by means of an apparatus according to any one of claims 1 or 2.

* * * * *